United States Patent
Knemeyer et al.

[11] 3,800,127
[45] Mar. 26, 1974

[54] VERTICAL RATE REFERENCE COMPUTER FOR CONTROL OF A VTOL OR STOL AIRCRAFT AT A CONSTANT FLIGHT PATH ANGLE

[75] Inventors: Siegfried Knemeyer, Yellow Springs; Genese L. Fileccia, New Carlisle, both of Ohio

[73] Assignee: The United States of America as represented by the Secretary of the Air Force, Washington, D.C.

[22] Filed: Sept. 11, 1972

[21] Appl. No.: 288,212

[52] U.S. Cl. .......... 235/150.22, 244/77 A, 244/77 D
[51] Int. Cl. ........................ B64c 13/50, B64c 19/00
[58] Field of Search ...................... 244/77 A, 77 D; 235/150.22

[56] References Cited
UNITED STATES PATENTS
3,482,805  12/1969  Knemeyer .................... 244/77 D

*Primary Examiner*—Felix D. Gruber
*Assistant Examiner*—R. Stephen Dildine, Jr.

[57] ABSTRACT

A computer which derives the sine of the angle between a desired flight path and the horizontal, and thereafter derives the product of the sine and the velocity vector of the aircraft as a reference vertical rate which the aircraft must maintain to hold the flight path angle constant. The actual vertical rate of the aircraft is continuously compared with the reference rate to obtain a vertical rate error signal. The error signal may be visually displayed on a suitable attitude director indicator to permit the pilot to manually hold the vertical rate at the value required to maintain a constant flight path angle, or it may be applied to the automatic flight control system of the aircraft for automatic control of the vertical rate. For VTOL aircraft the error signal is applied to the vertical thrust control channel of the automatic flight control system, which for helicopters is the collective channel, while for STOL aircraft the error signal is applied to the pitch axis channel of the autopilot.

6 Claims, 6 Drawing Figures

$$\frac{\dot{H}}{V} = \frac{X}{R} = \sin\gamma \quad (MODE\ I)$$

$$\dot{H}_r = V\frac{X'}{R} = V\sin\gamma' \quad (MODE\ II)$$

VERTICAL RATE REFERENCE COMPUTER FOR CONTROL OF A VTOL OR STOL AIRCRAFT AT A CONSTANT FLIGHT PATH ANGLE

BACKGROUND OF THE INVENTION

This invention relates to flight control systems for VTOL (vertical takeoff and landing) and STOL (short takeoff and landing) aircraft.

Flight control systems for aircraft of the above type, as far as applicants know, do not provide for controlled flight along paths inclined to the horizontal. U. S. Pat. No. 3,482,805, issued Dec. 9, 1969, to Siegfried Knemeyer and hereby incorporated by reference in this application, describes a pilot assisting system for controlling the movements of a helicopter or other VTOL aircraft in the vertical direction. This system senses the up or down force applied by the pilot to the collective control lever of a helicopter, or to the corresponding vertical thrust control lever of other VTOL aircraft, and produces an up or down acceleration proportional to the force and for as long as the force is applied. When the force is removed, the system stabilizes the rate of climb or descent at the rate the aircraft had at the instant the force was removed. In addition, whenever the rate of climb or descent is less than a preset low value near zero and pilot force is removed from the control lever, the aircraft is stabilized in altitude at the altitude it had at the instant the force was removed. However, the system provides no means for controlling the vertical rate of the aircraft in accordance with the horizontal rate as would be required to control the flight of the aircraft along a path inclined to the horizontal.

SUMMARY OF THE INVENTION

The purpose of the invention is to provide apparatus for controlling the flight of a VTOL or STOL aircraft along a straight path inclined to the horizontal at a constant preestablished angle. A more specific purpose is to add an inclined path flight control capability to the helicopter collective control system described in the above referenced U.S. Pat. No. 3,482,805.

Essentially the device is a computer which operates in two modes. Initially the desired flight path is established by the pilot through the manual controls. During this period the computer operates in its first mode in which it continuously determines the sine of the flight path angle as the ratio of the vertical rate of the aircraft to its velocity vector. When the desired flight path has been established the pilot transfers the computer to its second mode of operation. In this mode the sine of the flight path angle is fixed at the value it had at the instant of mode transfer and a reference vertical rate is continuously derived as the product of the aircraft velocity vector and the fixed value of the sine. An error signal is derived as the difference between the reference rate and the actual vertical rate determined by an altitude transducer aboard the aircraft. This may be a D.C. signal the magnitude of which is proportional to the magnitude of the error and the polarity of which indicates the direction of the error. For manual flight the error signal is visually displayed on a suitable ADI (attitude director indicator) in which case the pilot maintains the correct flight path angle by controlling the vertical rate of the aircraft through the manual controls in such manner as to maintain the error signal at zero. This is accomplished in helicopters through the collective control lever and in other VTOL aircraft through the corresponding vertical thrust control. In fixed wing STOL aircraft, the vertical rate is controlled through use of the elevators to control the pitch attitude of the aircraft. For automatic flight the error signal is applied to the vertical thrust control channel of the automatic flight control system for VTOL aircraft or to the pitch axis control channel of the autopilot in the case of fixed wing STOL aircraft.

DETAILED DESCRIPTION

Figure 1:
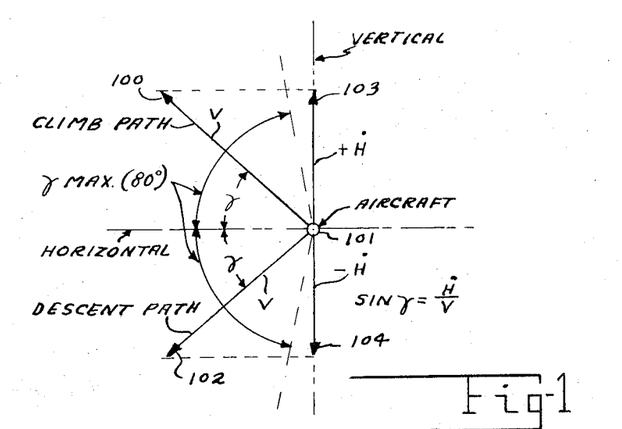
FIG. 1 is a diagram illustrating the velocity vector V, the vertical rate vector $\dot{H}$, and the flight path angle $\gamma$ for representative aircraft flight paths at an angle to the horizontal.

Referring to FIG. 1, the vector 100 may represent the magnitude and direction of the velocity of an aircraft 101 during a climbing maneuver. Similarly, the vector 102 may represent the magnitude and direction of the velocity of the aircraft during descent. The vectors 103 and 104 represent the magnitude and direction of the vertical velocities or rates in each case. The angle between the velocity vectors and the horizontal is designated $\gamma$. It will be apparent that $\sin \gamma = \dot{H}/V$, where $\dot{H}$ is the magnitude of the vertical rate vector 103 or 104 and V is the magnitude of the velocity vector. The computer to be described first derives the value of $\sin \gamma$ from measured values of V and $\dot{H}$, and thereafter multiplies this value of the sine by V to obtain a reference value $\dot{H}_r$ of the vertical rate, which is the vertical rate that must be maintained by the aircraft in order to fly a straight path at a constant value of $\gamma$.

Figure 2:
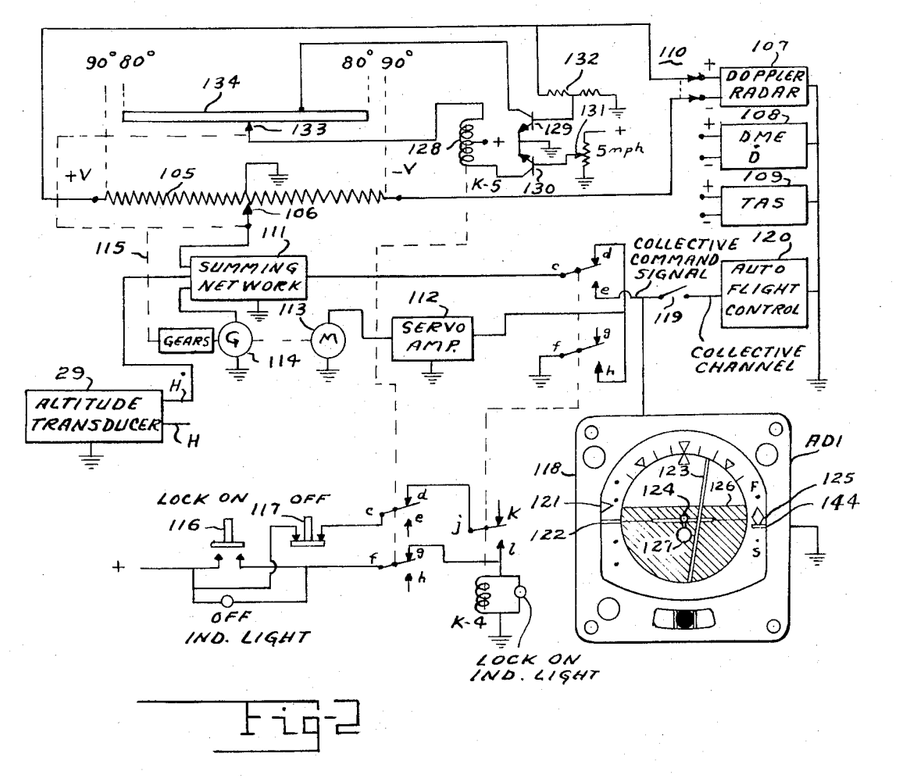
FIG. 2 illustrates the vertical rate reference computer as applied to a helicopter.

FIG. 2 shows the vertical rate reference computer as applied to a helicopter. The computer comprises a center tapped resistor 105 having a sliding contact 106. The voltage drops +V and −V across the two halves of the resistor are equal and each is the analog of the magnitude V of the velocity vector of the aircraft. The voltage V is derived from equipment on the aircraft which may take several forms. One source is the doppler radar 107 which provides a direct voltage proportional to the velocity vector of the aircraft relative to the earth. Another is the DME (distance measuring equipment) 108 used in conjunction with the VOR (very high frequency omni range). This equipment provides the distance to the VOR station and also the rate of change of this distance $\dot{D}$ which is the radial velocity of the aircraft relative to the VOR station. If the aircraft is descending toward the station, $\dot{D}$ is essentially the velocity vector. A third source of the voltage V is TAS (true airspeed) equipment 109 which provides a voltage proportional to the velocity vector of the aircraft in the air mass. All of these equipments are well known and in use in aircraft, and their construction forms no part of the invention. For those which do not supply output voltages balanced with respect to ground as illustrated, such voltages may be obtained from an unbalanced output voltage without difficulty by the use of any of the operational amplifiers available for that purpose. A two pole three position switch 110 is provided to select any of the three sources of V.

Figure 3:
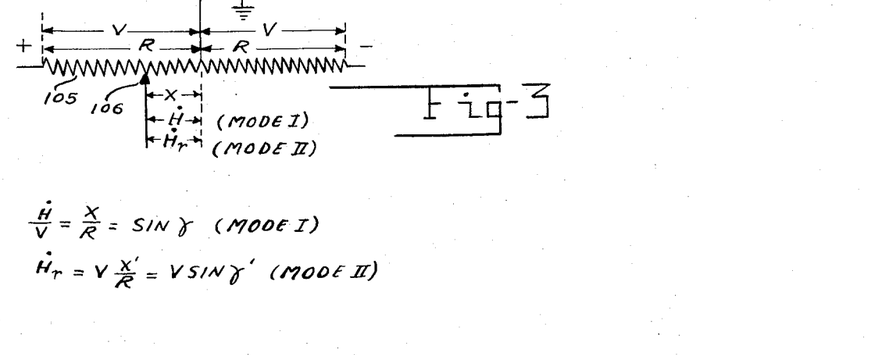
FIG. 3 illustrates the manner in which the computer derives the vertical rate reference.

In computer operating mode I, in which the pilot is manually maneuvering the aircraft into the desired inclined flight path, the voltage between contact 106 and ground is continuously maintained equal to the voltage analog $\dot{H}$ of the vertical rate, or rate of change of altitude, of the aircraft as provided by altitude transducer 29. As better seen in FIG. 3, in which R represents the total resistance of each of the two equal sections of potentiometer 105 and $x$ represents the resistance between contact 106 and ground, the position of contact 106 is continuously adjusted as required to keep the voltage drop across $x$ in equality with the vertical rate analog $\dot{H}$ generated by transducer 29. This is accomplished by a servomechanism comprising summing network 111, servoamplifier 112, servomotor 113, and D.C. generator 114. The motor drives generator 114 and also moves contact 106 along potentiometer 105 through a suitable mechanical coupling 115. The summing network derives the algebraic sum of its inputs, which are the voltage between contact 106 and ground, the voltage $\dot{H}$ from altitude transducer 29, and the output voltage of generator 114. The mechanism is so arranged that contact 106 is always driven to the side of the potentiometer 105 that has the polarity that is opposite to the polarity of $\dot{H}$. For example, if $\dot{H}$ is negative, representing a descending aircraft, contact 106 is driven to the positive side of the potentiometer, as shown in FIG. 3. The output of network 111 is an error signal proportional to the difference between $\dot{H}$ and the voltage at contact 106 with a polarity determined by which of the two voltages is the greater. The error signal is applied to servoamplifier 112 through normally closed contacts c-d of relay K–4 and, after suitable amplification, to D.C. motor 113 to drive it in a direction determined by the error signal polarity. D.C. generator 114 is so poled that its output voltage is opposite in polarity to the error signal and therefore operates as a negative feedback to keep the motor speed proportional to the magnitude of the error signal. A suitable altitude transducer 29 is shown in FIG. 3 of the above referenced U.S. Pat. No. 3,482,805.

When the pilot has established the desired inclined flight path he may transfer the computer to mode II operation for controlled flight along the selected path. This is accomplished by momentarily depressing "LOCK ON" button 116 which energizes relay K–4 through normally closed contacts $f$–$g$ of relay K–5. Relay K–4 holds through the "OFF" button 117 contacts, normally closed contacts $c$–$d$ of K–5, and normally open contacts $j$–$l$, now closed, of K–4. Energization of relay K–4 removes the error signal from the servoamplifier at contacts $c$–$d$ and applies it through contacts $c$–$e$ to ADI (attitude direction indicator) 118 and, if switch 119 is closed, to the collective channel of the automatic flight control 120 of the helicopter. This action freezes the contact 106 at the position on the potentiometer it had at the instant the "LOCK ON" button was depressed.

In mode II the potentiometer 105 and fixed contact 106 constitute a potential divider for multiplying the velocity vector voltage analog V by the sine of $\gamma'$, which is the value of $\gamma$ at the instant of transfer, in order to obtain the vertical rate reference voltage $\dot{H}_r$. This represents the vertical rate that the aircraft must maintain in order for the flight path angle $\gamma$ to remain fixed at the value $\gamma'$ it had at the time the "LOCK ON" button was depressed. The relationships for both modes are illustrated in FIG. 3. In mode I, the ratio $x/R$ varies as the sine of $\gamma$ varies as the result of variations in either or both of the voltages V and $\dot{H}$. In mode II, $x$ is fixed at the value $x'$ it had at the instant the "LOCK ON" button was depressed to transfer to this mode and the multiplying factor $x'/R$ is fixed at a value equal to the sine of $\gamma'$.

The error signal applied to ADI 118 and to automatic flight control 120 in mode II is the difference between the actual vertical rate $\dot{H}$ of the aircraft derived from transducer 29 and the reference vertical rate $\dot{H}_r$ provided at contact 106, both of which voltages are applied as inputs to summing network 111. If the actual rate equals the reference rate the error signal is zero and the aircraft is correctly following the initially established constant angle path. Deviations from the reference rate produce error signals proportional to the magnitude of the error and of polarity indicative of the direction of the error.

For manual control of the aircraft along the initially established flight path the error signal is displayed to the pilot on the collective command needle 121 of the helicopter ADI 118. The zero reference for this needle is the line 122. Following the standard procedure of "flying to the needle," an error signal calling for an increase in vertical rate would cause the needle to appear above the reference, as illustrated in FIG. 2, and the pilot would respond by applying upward pressure on the collective stick until the needle returns to zero.

The primary flight controls of a helicopter are described briefly in U.S. Pat. No. 3,528,633, issued to Siegfried Knemeyer on Sept. 15, 1970. Although the collective command needle is the only part of the ADI used with the vertical rate reference computer, the indicator also contains a roll axis cyclic command needle 123 for which the zero reference is at point 124 and a pitch axis cyclic command needle 144 for which the zero reference is the center of diamond 125. A gyro controlled artificial horizon similar to that provided in fixed wing aircraft is indicated at 126. Point 124 on the symbolic helicopter 127 also represents the position of the nose of the helicopter relative to the horizon, a nose low attitude being represented in the drawing. Since the pitch axis attitude of the helicopter determines the horizontal component of the thrust which in turn determines the horizontal speed, pitch axis cyclic command needle 144 provides a "SLOW-FAST" command which is executed by moving the cyclic stick forward to increase speed and backward to reduce speed. The drawing displays a reduce speed command which when executed will cause the nose of the helicopter to rise toward the horizon. The roll axis attitude of the helicopter determines the direction of the horizontal component of the thrust relative to the longitudinal axis of the aircraft and therefore the component of the horizontal thrust acting laterally of the aircraft. Turns are therefore executed by lateral pressure on the cyclic stick. Roll axis command needle 123 is pivoted on the vertical center line of the indicator and indicates by its tilt the commanded direction and degree of lateral movement of the cyclic stick. The drawing illustrates a roll axis command to the right.

Provision is made in FIG. 2 for automatically switching the computer from mode II operation to mode I operation or, if in mode I, for preventing its being switched to mode II operation whenever V falls below such a low value that, from an instrumentation standpoint, it is not practical to determine the ratio H/V, which is the sine of $\gamma$, accurately. For helicopters this low value of V may be set at 5 mph. Provision is also made to prevent switching from mode I operation to mode II operation whenever $\gamma$ exceeds a preset maximum value near 90°, which is possible in VTOL aircraft. As $\gamma$ approaches 90° the sine approaches unity and the rate of change of the sine approaches zero. This makes it difficult to determine $H_r$ accurately at these angles since it is substantially equal to V.

The above safeguards are provided by relay K–5. The current in the upper half of winding 128 is controlled by transistor 129 and that in the lower half by transistor 130. A fixed positive voltage representing the above mentioned low value of V is applied to the base of transistor 130 from potentiometer 131. A positive voltage representing the instantaneous value of V is applied to the base of transistor 129 through potential divider 132. When V $\geq$ 5 mph and contact 133, which moves with contact 106, is on conductive strip 134, as it will be for all values of $\gamma \leq$ 80°, relay contacts $c$–$d$ and $f$–$g$ are closed, as shown, and the computer, if in mode I, can be switched by "LOCK ON" button 116 to mode II through contacts $f$–$g$ or, if in mode II, is held in that mode through contacts $c$–$d$. When V < 5 mph, or when $\gamma$ > 80° breaking the connection between contact 133 and strip 134, the current in the upper half of winding 128 is less than in the lower half and contacts $c$–$d$ and $f$–$g$ are open. If the computer is in mode II, the opening of contacts $c$–$d$ breaks the holding circuit for K–4 and switches the computer to mode I. If the computer is in mode I, it can not be switched to mode II since contacts $f$–$g$ are open.

Figure 4:
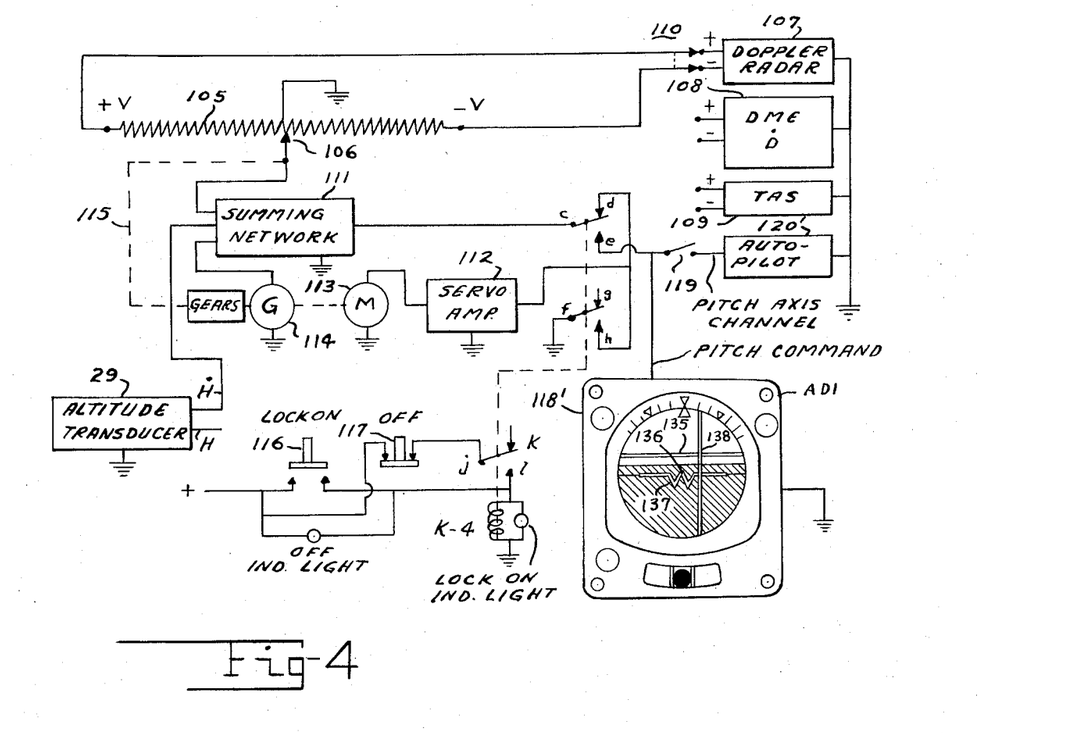
FIG. 4 illustrates the vertical rate reference computer as applied to a fixed wing STOL aircraft.

FIG. 4 shows the application of the vertical rate reference computer to a fixed wing STOL aircraft. Since STOL aircraft are not capable of the steep flight path or slow speeds which make the safeguards provided by relay K–5 and associated circuits necessary, this structure is omitted from FIG. 4. The construction and operation are the same as in FIG. 2 except that an ADI 118' suitable to fixed wing aircraft is used and the error signal is applied as a pitch axis command to this instrument and, for automatic control, to autopilot 120'. In this ADI, 135 is the pitch axis command needle for which the zero reference is the reference point 136 on the symbolic fixed wing aircraft 137. As shown, the needle calls for a reduction in vertical rate by raising the aircraft nose following the standard "fly to the needle" procedure. Needle 138, for which point 136 is also the zero reference, provides the roll axis command.

In both FIGS. 2 and 4, the computer can be switched from mode II operation to mode I operation at any time by depressing "OFF" button 117 which breaks the holding circuit of relay K–4. In mode I, as already described, the computer operates continuously to maintain equality between the voltage at contact 106 and the voltage analog H of the vertical rate.

Figure 5A:
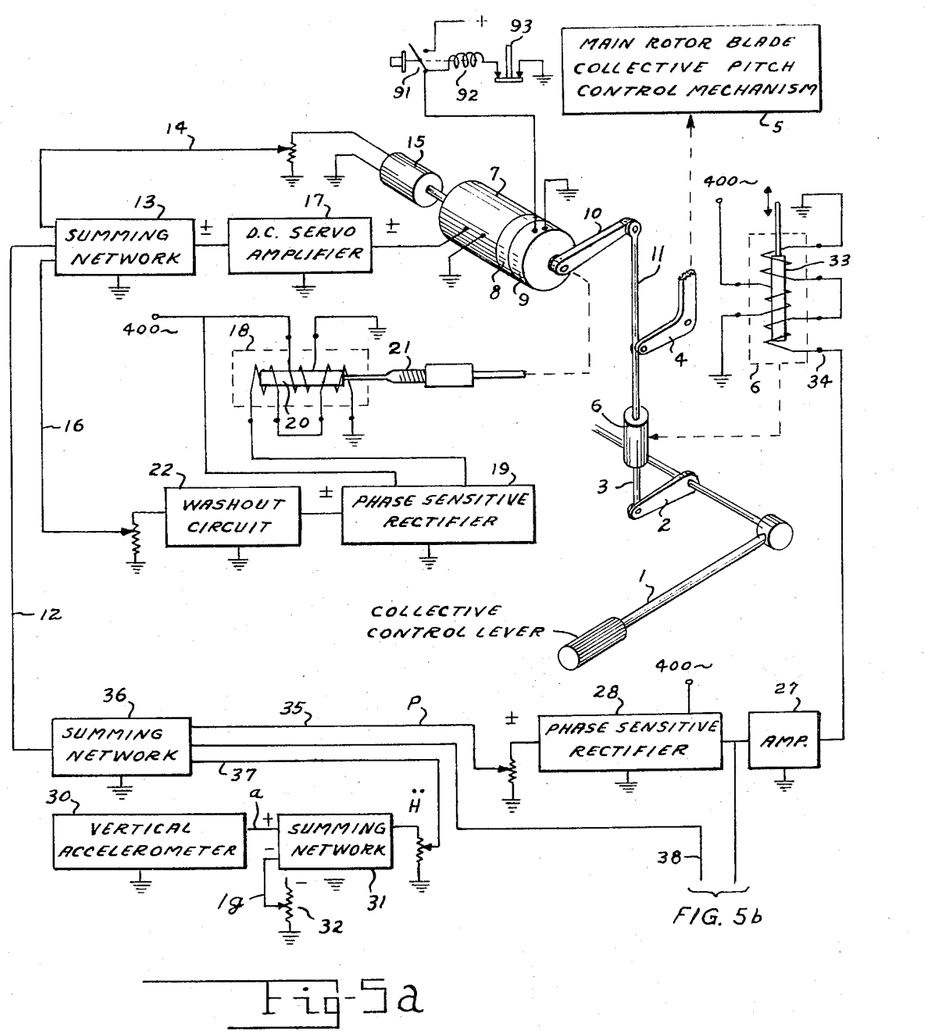
FIGS. 5a and 5b illustrate the vertical rate reference computer as applied to a helicopter having the collective control system shown in referenced U.S. Pat. No. 3,482,805.
Figure 5B:
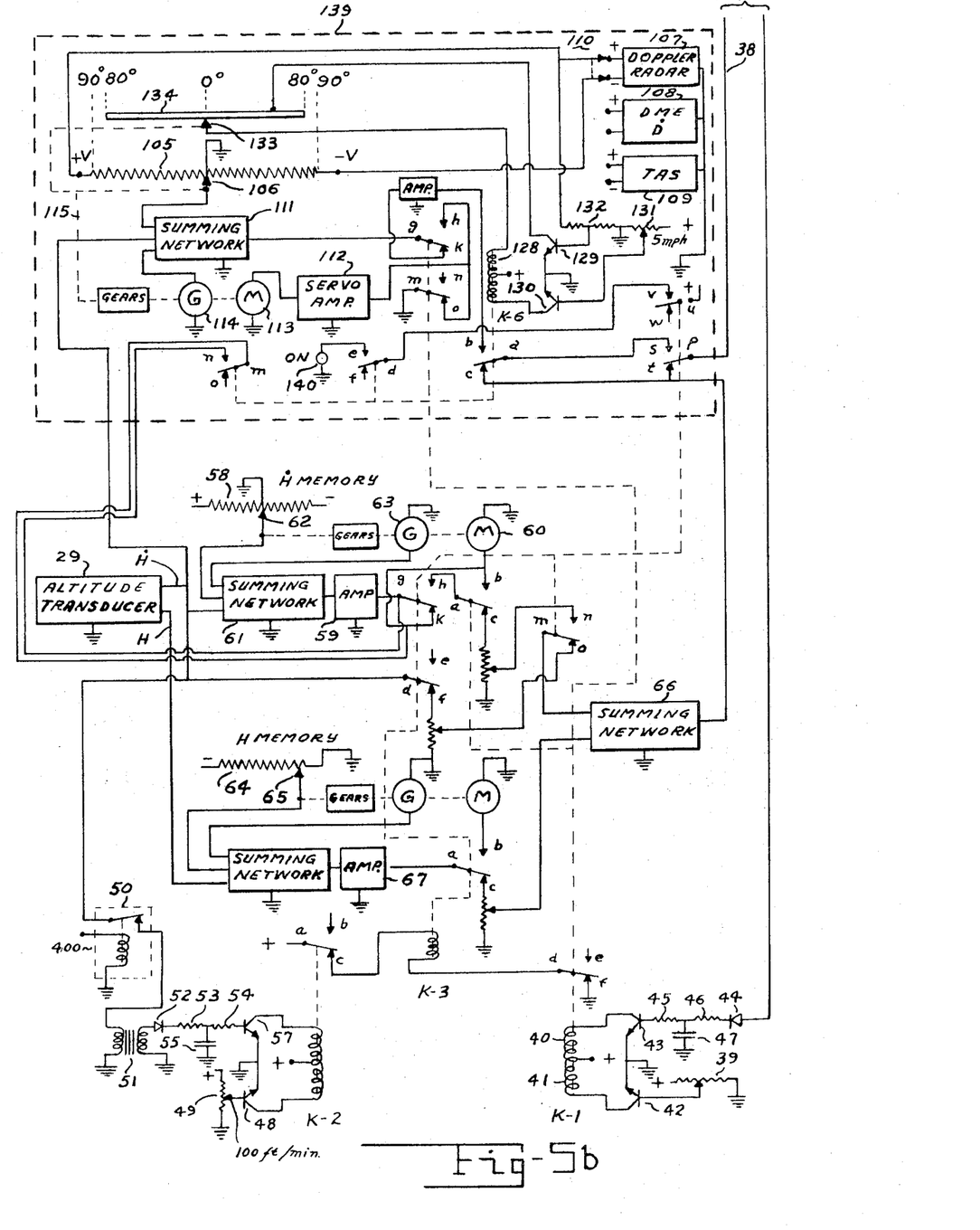

FIGS. 5a and 5b illustrate the application of the vertical rate reference computer to the helicopter collective control system described in the above referenced U.S. Pat. No. 3,482,805 for the purpose of providing this system with an inclined flight path capability. That part of FIGS. 5a and 5b situated outside of rectangle 139 is identical to FIG. 1 of U.S. Pat. No. 3,482,805 except that the single-pole double-throw switch provided by the contacts of relay K–6 and similar added contacts $p$–$s$–$t$ of relay K–1, located within rectangle 139, provide continuity in line 38. With contacts $a$–$c$ of K–6 and $p$–$s$ of K–3 closed, or with contacts $p$–$t$ of K–3 closed, the computer is isolated from the collective control system and the operation is the same as in the patent. A description of the system external to rectangle 139 follows:

As stated earlier, a brief description of the primary controls of a helicopter is given in U.S. Pat. No. 3,528,633. The collective control governs the vertical movements of the helicopter, i.e. the rate of climb or descent. The pilot's input to this control is through the collective lever 1 which operates through crank arm 2, push rod 3, and crank arm 4 to actuate the main rotor blade collective pitch control mechanism 5. The mechanical design of this mechanism need not be explained for the described system to be understood. Its function is to vary the pitch of all of the main rotor blades in the same direction and to the same degree, thereby changing the magnitude of the thrust of the main rotor without changing the direction of the thrust. The main rotor operates at constant speed. Force sensor 6, to be explained later, does not interfere in any way with the manual operation of the collective mechanism.

Pilot assist in the operation of the mechanism 5 is provided by D.C. servomotor 7 which operates through an integral reduction gear (not shown), override clutch 8, electromagnetic engage clutch 9, crank arm 10, and link 11 to drive input crank arm 4. The servomotor 7 operates in parallel to the manual control. A series acting servomotor energized along with motor 7 and inserted in series with the linkage at an appropriate point beyond crank 4 may be used in addition to motor 7 if desired. This practice is well known in the art but is not illustrated for simplicity. Motor 7 is part of a servomechanism which operates in response to a D.C. servo control signal on line 12 to cause motor 7 to run at a speed proportional to the magnitude of the signal and in a direction determined by the polarity of the control signal. Summing network 13 produces the algebraic sum of the control signal and two negative feedback signals, one on line 14 which is proportional to the speed of motor 7 and derived from D.C. tachometer 15, and the other on line 16 which is a function of the angular position of arm 10 measured from its neutral position. The magnitude of the input signal to servo amplifier 17 therefore equals the difference between the control signal on line 12 and the sum of the two negative feedback signals. The position feedback signal is derived from a circuit including an A.C. linear position transducer 18, such as a differential transformer or the equivalent, phase sensitive rectifier 19 and washout circuit 22. Transducer 18 produces an A.C. signal proportional to the angular displacement of arm 10 from its neutral position and having a phase difference relative to the reference phase of the A.C. energization of 0° or 180° depending upon the direction of the displacement. The linear movement of magnetic element 20 of transducer 18 is made proportional to the angular movement of arm 10 by screw 21. Phase sensitive rectifier 19 converts the A.C. output of the transducer to a proportionate D.C. signal with polarity corresponding to the phase of the A.C. signal. A suitable phase sensitive rectivier is shown in FIG. 4 of referenced U.S. Pat. No. 3,482,805. The washout circuit 22 produces an output signal proportional to the time integral of the rate of change of its input signal, with provision for the output signal to decay to zero in a short interval after the input ceases to change. A suitable embodiment is shown in FIG. 5 of referenced U.S. Pat. No. 3,482,805, in which elements 23–24 form a differentiating network and elements 25–26 an integrating network. The rate at which the output signal decays is determined by the size of capacitor 26 and the total shunt resistance. The effect of the feedback on line 14 is to cause motor 7 to run at a speed proportional to the control signal magnitude; the effect of the position feedback is to provide rapid movement in the early part of an operation with an increased negative feedback toward the end to reduce overshoot. The design of the above-described servomechanism follows established practice.

The collective stabilizing system operates in response to pilot applied force to collective control lever 1 to establish a vertical acceleration directly related to the force and, upon release of the force, to automatically maintain the rate of climb or descent that the helicopter had at the time the force was released. The rate of climb or descent can be increased or decreased at any time by applying further force to the collective lever in the proper direction. Whenever the rate of climb or descent has been reduced below a preset small value, for example, 100 feet per minute, or, for any reason, is below this small rate, release of force on the collective lever causes the system to stabilize the altitude of the helicopter at the value it had at the instant force was released.

The following primary control signals are employed in the system:

P — A bipolar D.C. signal proportional to the force applied by the pilot to the collective lever, the polarity indicating the direction of the force. Produced by combined action of elements 6, 27 and 28.

H — A unipolar D.C. signal representing the altitude of the helicopter above ground. Produced by altitude transducer 29.

$\dot{H}$ — A bipolar D.C. signal representing the rate of change of H, or the rate of climb or descent. Polarity determined by whether altitude is increasing or decreasing. Produced by altitude transducer 29.

a — A D.C. signal representing the total vertical acceleration of the helicopter. Normally unipolar, it would change sign only for a downward acceleration greater than one g.

$\ddot{H}$ — A bipolar signal representing the effective vertical acceleration of the helicopter. Its value is a–g derived at summing network 31.

The pilot exercises his control over the collective stabilization system entirely through the regular manual collective control lever 1. Any force applied to the lever is sensed by force sensor 6, a suitable design for which is disclosed in detail in referenced U.S. Pat. No. 3,528,633. The transducing element in the sensor is essentially a differential transformer, as shown, in which compressive and tensional forces applied to it move magnetic element 33 in opposite directions relative to the windings. In the zero force position of this element, equal coupling exists between the energized primary winding and each of two secondary windings which are connected in series in phase opposition. Consequently, for zero force, there is no output at terminal 34. When a force is applied, the coupling to one of the secondaries predominates producing a net output at terminal 34 proportional in amplitude to the force and in phase with or in phase opposition to the primary energization depending upon the direction of the force applied to the collective control lever. This signal, after amplification in amplifier 27, is converted to a proportionate D.C. pilot force signal P, defined above, in which the polarity conveys the directional information, by phase sensitive rectifier 28.

The operation of the collective stabilization system will be described starting with the helicopter resting on the ground prior to take off with no force applied to the collective control lever 1. Under these conditions, the signal P on input 35 to summing network 36 is zero since there is no force on stick 1; the signal $\ddot{H}$ on input line 37 is zero since "a" = g; and the signal on input line 38 is zero. The last statement requires further explanation, as follows:

The contacts a–c and d–f of relay K–1 are closed whenever the force exerted by the pilot on lever 1 in either direction is below a preset small breakout value, which is determined by the setting of potentiometer 39. K–1 is a polarized relay having coils 40 and 41 which produce opposing fluxes. When the current in coil 41 predominates, contacts a–c and d–f are closed and when the current in coil 40 predominates contacts a–b and d–e are closed. The current in coil 41 is controlled by the preset breakout potential applied to the base of transistor 42 from potentiometer 39. The current in coil 40 is controlled by the force applied to lever 1 which controls the potential applied to the base of transistor 43. Any force on lever 1 which produces an output from force sensor 6 exceeding the built-in "noise" threshold of amplifier 27 results in an output from this amplifier which is rectified by diode 44 to produce a direct voltage proportional to the absolute magnitude of the output, which in turn is applied to the base of transistor 43 through time constant network 45–46–47. Therefore, when the pilot applied force is less than the breakout value preset at potentiometer 39 contacts a–c and d–f are closed and when greater contacts a–b are closed and contacts d–f open. Relay K–2 is identical to relay K–1 except that it is controlled in accordance with the absolute value of $\dot{H}$, from altitude transducer 29, and a preset small vertical rate, such as 100 feet per minute, represented by the potential applied to the base of transistor 48 from potentiometer 49. For controlling K–2, the absolute value of $\dot{H}$ is derived by a chopper 50 and transformer 51, which convert the D.C. signal to an A.C. signal, and rectifier 52 which, together with filtering and time constant circuit 53-54-55, produce a positive direct potential on the base of transistor 57 proportional to the absolute value of $\dot{H}$. Thus, when $\dot{H}$ is less than 100 ft/min contacts a–c of K–2 are closed and when greater contacts a–c are open. In the above-stated condition of the helicopter, contacts a–c and d–f of K–1 are closed and contacts a–c of K–2 are closed, since the pilot force is zero and $\dot{H}$ is zero.

The H and $\dot{H}$ memories will now be explained. The H memory is a potentiometer 58, the grounded center of which corresponds to $\dot{H}$=0 and the oppositely poled extremities of which represent maximum rate of climb and maximum rate of descent. The polarities of $\dot{H}$ as produced by altitude transducer 29 are opposite for rate of climb and rate of descent. If the output of amplifier 59 is coupled to motor 60, either through contacts g–h of K–3 and a–b of K–1 or through contacts g–k of K–3, and if the helicopter has a vertical velocity, the resulting $\dot{H}$ signal is applied through summing network 61 to the input of amplifier 59 causing motor 60 to run and drive contact 62 along the potentiometer. The arrangement is such that the contact 62 is driven toward that side of the potentiometer that has the polarity opposite to the polarity of $\dot{H}$. This produces a feedback voltage to the input of summing network 61 of opposite sign to the $\dot{H}$ voltage. The third input to the summing network is a negative feedback proportional to the speed of motor M and derived from D.C. generator 63. Network 61 produces the algebraic sum of these three signals which serves as the input signal for amplifier 59. With sufficient gain in the amplifier, this signal causes motor 60 to run as required to maintain the potential $\dot{H}_M$ at contact 62 in equality with $\dot{H}$ and opposite in polarity.

The H memory is an adjustable potentiometer and servo arrangement similar to the $\dot{H}$ memory for keeping the potential $H_M$ at adjustable point 65 on potentiometer 64 in equality with H whenever normally closed contacts a–b of K–3 are closed. The operations of the two systems are the same except that the two signals in the H case are unipolar.

Relay K–3 is normally spring biased upward. Therefore, the contacts a–b, d–e, g–h and m–n of this relay are normally closed. However, for the specified initial conditions, $\dot{H}=0$ causing contacts a–c of K–2 to be closed and, since the control lever force is zero, contacts d–f of K–1 are also closed. Therefore K–3 is energized, causing all of its normally open contacts to be closed, as shown in the drawing. Since $\dot{H}=0$, the input to summing network 66 through contacts d–f and m–o of K–3 is zero. Further, since H and $H_M$ are zero, their difference applied through amplifier 67 and contacts a–c of K–3 to summing network 66 is zero. Consequently, the input signal to summing network 36 on line 38 is zero.

To take off, the pilot applies upward force to the collective lever 1 which produces a proportionate D.C. signal P on line 35 of polarity representative of the force direction. This signal is applied through summing network 36 to line 12 as a control signal to the pitch control servomechanism causing servomotor 7 to run at proportionate speed and in the proper direction to increase the blade pitch at a rate proportional to the force applied to the lever. This produces an increasing lift which first overcomes the weight of the helicopter and then gives it an increasing upward acceleration.

Accelerometer 30 produces a D.C. output signal "a" proportional to the total vertical acceleration. On the ground, the total acceleration is the acceleration of gravity g. This signal is algebraically added to a constant D.C. signal of opposite sign and proportional to the acceleration of gravity g, derived from potentiometer 32, to produce the effective acceleration signal $\ddot{H}$ which is zero when the helicopter is on the ground. The increasing vertical acceleration of the helicopter gives rise to an increasing $\ddot{H}$ which is applied to input 37 of summing network 36 with opposite polarity to P so that the servo control signal on line 12 is now P–$\ddot{H}$. The acceleration continues to increase until $\ddot{H}$ substantially equals P where it stabilizes. Therefore the acceleration produced is proportional to the force applied to the collective lever 1.

The force applied to the lever caused contacts a–b of K–1 to close, as previously explained, connecting amplifier 59 to motor 60 through normally closed contacts g–h of K–3, this relay having been de-energized by the opening of contacts d–f of K–1. The upward acceleration gives rise to an increasing rate of climb $\dot{H}$ which is followed by contacts 62 of the $\dot{H}$ memory, as already explained. Moreover, the upward acceleration increases altitude, giving rise to an H signal which, since contacts a–b of K–3 are now closed, is followed by contact 65 of the H memory, as already explained.

When the rate of climb has reached a desired value greater than the above preset low value of 100 ft/min the pilot may stabilize the climb of the helicopter at this rate by releasing the force applied to the collective control lever. This reduces P to zero, closes contacts a–c of K–1, and opens contacts a–b of K–1 stopping contact 62 of the $\dot{H}$ memory on the rate of climb at the instant force was removed from the lever. The difference, initially zero, between the actual rate of climb signal $\dot{H}$ and the rate of climb signal $\dot{H}_M$ stored in the memory is applied through amplifier 59, normally closed contacts g-h of K–3, which remains de-energized since $\dot{H} > 100$ ft/min, contacts a-c of K–1, normally closed contacts m-n of K–3, summing network 66, and summing network 36 to the input of the blade pitch controlling servomechanism. The result is to hold $\dot{H}$ in equality with $\dot{H}_M$. At the same time the contact 65 continues to follow the increasing value of H as the altitude increases since normally closed contacts a–b of K–3 are closed.

If the pilot again applies upward pressure to the collective lever a further increase in main rotor blade pitch occurs producing an increased upward thrust. This produces a further upward acceleration and increasing rate of climb in exactly the same manner as described above. If downward pressure is applied to the lever, the sign of P changes, which reduces the main rotor blade pitch and the main rotor thrust. If there is an upward acceleration at this time it is reduced at a rate proportional to the force and the value of $\dot{H}$ reduces without changing sign. If the vertical acceleration is zero, or, if initially upward, has been reduced to zero by the downward pressure on the control lever, a downward acceleration is produced proportional to the applied force, $\dot{H}$ in this case changing sign. Variations in rate during descent and changes from descent to climb are accomplished in a similar manner.

During the above actions, all of the time during which the force applied to the collective lever exceeds the breakout value, the potentials $\dot{H}_M$ and $H_M$ in the corresponding memories follow the values of $\dot{H}$ and H, or the actual rate of decline or descent and the actual altitude of the aircraft. This is insured by the contacts d–f of K–1 which act as an interlock to prevent the energization of K–3 when force is applied to the control lever, even though contacts a–c of K–2 may close due to the rate of climb or descent falling below 100 ft/min.

If at any time the rate of climb or descent is brought below 100 ft/min, or other preset low value, and the pilot applied force to the collective control lever is removed, relay K–3 is energized through contacts a–c of K-2 and contacts d-f of K-1. The opening of contacts a-b of K-3 causes the contact 65 on the H memory potentiometer to stop at a potential $H_M$ equal to the value of H at the time the force was removed. The closing of contacts a-c of K-3 causes the signal at the output of amplifier 67, which is proportional to the difference, initially zero, between H and $H_M$ to be applied to one input of summing network 66. The closing of contacts d-f of K-3 causes the signal $\dot{H}$, at the output of altitude transducer 29, to be applied through now closed contacts m-o of K-3 to the other input of summing network 66. The output of network 66, consisting of the $\dot{H}$ and the H—$H_M$ signals, is applied through summing network 36 to the input of the main rotor blade pitch control servomechanism. This causes the blade pitch to be controlled in such manner as to maintain equality between the signals H and $H_M$, or in effect to maintain the altitude of the helicopter at the altitude it had at the instant force was removed from the collective lever. The presence of the $\dot{H}$ term in the control signal insures that the rate of any altitude correction will be proportional to the error.

The electromechanical clutch 9 for coupling servomotor 7 to the pitch control mechanism is engaged by manually closing switch 91, which is then held closed by holding coil 92. The clutch may be released at any time by means of normally closed push button 93 which breaks the holding circuit. The push button is placed where it can be instantly actuated by the pilot. Override clutch 8 is a required safety feature which permits the pitch control mechanism to be operated manually by supplying sufficient force to lever 1 should clutch 9 fail to release for any reason.

The computer shown within the rectangle 139 is essentially the same in construction and operation as that shown in FIG. 2, except for the manner of switching between the operating modes I and II which is accomplished in the system of FIG. 5 a-b by the presence or absence of pilot force on the collective control lever 1. This is brought about by having two additional contact sets on relay K-1, designated g-h-k and m-n-o, perform the function of contact sets c-d-e and f-g-h of K-4 of FIG. 2. Relay K-6 operates in a manner similar to relay K-5 of FIG. 2 in that it is actuated upward closing contacts a-b and opening contacts a-c when $\gamma \leq 80°$ and $V \geq 5$ mph. At angles greater than 80° or speeds less than 5 mph the relay is actuated downward closing contacts a-c and opening contacts a-b. The effect of this is to exclude the vertical rate reference computer from the system in the latter case by breaking the error signal output circuit at contacts a-b. The rectangle 139 also includes a set of contacts p-s-t added to relay K-3. The purpose of this set of contacts is to exclude the computer from the system by breaking of contacts p-s whenever force is removed from the collective control lever 1 at vertical rates less than 100 feet/minute or other low value preset at potentiometer 49. In either exclusion, summing network 66 is directly connected to summing network 31, either by closed contacts p-s of K-3 and a-c of K-6 or closed contacts p-t of K-3, and operation of the system external to rectangle 139 is as described above.

The operation of the comphete system of FIG. 5a-b will be described starting with the helicopter resting on the ground prior to takeoff, as in the above description of the collective control system. With no force applied to the collective control lever 1 and the helicopter at rest, the positions of all relay contacts are as shown in the drawing. Assume that the helicopter is to initially climb at a value of $\gamma$ greater than 80°. The application of upward force to the control lever 1 in excess of the minimum preset at potentiometer 39 causes an upward acceleration of the helicopter proportional to the force, as already explained. Application of force also places the computer in operating mode I by actuating relay K-1 upward closing contacts g-h and opening contacts m-o and d-f, the latter deenergizing relay K-3 which opens contacts p-t and closes contacts p-s of this relay. Closed contacts g-h of K-1 connect summing network 111 of the computer to servoamplifier 112 causing contact 106 to be driven toward the negative end of potentiometer 105 in an attempt to match the increasing positive voltage $\dot{H}$ from altitude transducer 29. However, since V and $\dot{H}$ are substantially equal when $\gamma$ is greater than 80° contact 106 will run to the end of the potentiometer carrying contact 133 beyond the end of conductive strip 134. This prevents contacts a-c of K-6 from opening when V exceeds 5 mph.

If the pilot now releases force on the control lever the vertical rate is stabilized at the value it had at the instant of force removal in a manner already described. This rate is maintained by an error signal at the output of summing network 66 which is applied through contacts a-c of K-6 and now closed contacts p-s of K-3 to summing network 36. Also, in a manner already explained, if the pilot reduces the vertical rate $\dot{H}$ below 100 ft/min by applying downward force on the control lever and, with the rate below this value, removes force from the control lever, the altitude H of the helicopter is stabilized at the value it had at the instant of force removal. The error signal at the output of summing network 66 for maintaining the altitude constant is applied to summing network 36 through contacts p-t of K-3, which were closed at the instant of force removal by the energization of relay K-3 through contacts d-f of K-1.

When force was removed from the control lever to stabilize the vertical rate, the komputer was switched to operating mode II by the opening of contacts g-h and the closing of contacts g-k and m-o of K-1. However, any error signal appearing at the output of summing network 111 could not reach line 38 since the circuit to this line is broken at open contacts a-b of K-6. Similarly, when control lever force was removed to stabilize the altitude of the aircraft the computer was again switched to operating mode II but no error signal from the computer could reach line 38 because contacts p-s of K-3 were open.

With the aircraft stabilized in altitude as above and no horizontal velocity, contact 106 is at or near the center of potentiometer 105, having been brought to the center from the extremity by following $\dot{H}$ down during the mode I operating state that existed while downward force was being applied to the control lever to reduce the rate of climb $\dot{H}$ to a value below 100 ft/min. If a horizontal velocity is now imparted to the aircraft through the cyclic control the aircraft continues to be stabilized in altitude. This is true even though relay K-6 is actuated since relay K-3 remains energized and its contacts p-t remain closed so that the collective control system continues to receive the altitude error signal from summing network 66.

Assume now that the pilot wishes to descend from horizontal flight ($\gamma = 0°$) along a flight path at a constant angle $\gamma$ less than 80°, for example, 45°. To accomplish this the pilot applies downward force on the collective lever to produce a downward rate, or $-\dot{H}$, as required to establish the 45° path. With force on the control lever the computer is in operating mode I, as already explained, and contact 106 is adjusted on the positive side of resistor 105 to a position where its voltage equals the negative $\dot{H}$ voltage from transducer 29. This will be at an intermediate point on the potentiometer since, at $\gamma = 45°$, V is greater than $\dot{H}$. When the desired flight path angle has been established, the pilot releases force on the control lever. This transfers the computer to mode II operation by opening contacts g–h and closing contacts g–k and m–0. As already explained for FIG. 2, this fixes contact 106 at the position it had at the instant of force removal and converts the potentiometer into a multiplier set at the sine of $\gamma$ at the instant of force removal. The voltage at contact 106 is therefore the product of V and the fixed value of the sine and represents the vertical rate that must be maintained to hold the flight path angle constant at the initial value. The error signal at the output of summing network 111 represents the difference between the above reference rate and the actual vertical rate provided by transducer 29. This error signal is applied through contacts g–k of K–1, a–b of K–6, and p–s of K–3 to the input of summing network 36 for automatically holding the vertical rate at the reference value provided by the computer.

The flight path angle may be changed at any time by applying force to the collective control in the proper direction and for the time required to establish the new flight path. During the time force is applied to the control the computer, operating in mode I, adjusts to the new angle. When force is removed the computer reverts to mode II operation for automatic flight along the newly established path in the manner above described.

Should the value of V for any reason fall below the minimum preset at potentiometer 131, in this case 5 mph, contacts a–b of relay K–6 would open and contacts a–c of this relay would close. This action removes the computer error signal from the system and substitutes the error signal at the output of summing network 66 through contacts a–c of K–6 and contacts p–s of K–3, the latter contacts being closed for values of $\dot{H}$ equal to or greater than the minimum set at potentiometer 49. The effect of this substitution is to stabilize the vertical rate at the value stored in the $\dot{H}$ memory 58 in the manner already explained. In order to insure that the stored value always equals the vertical rate of the aircraft at the instant a–b of K–6 opened, a set of contacts m–n–o is provided on this relay for connecting the output of amplifiers 59 to motor 60 of the $\dot{H}$ memory through contacts m–n whenever contacts a–b of K–6 are closed, i.e. whenever $\gamma \leq 80°$ and $V \geq 5$ mph. This is necessary since the $\dot{H}$ memory, although it follows the vertical rate during mode I operation of the computer, would not otherwise follow the changes in vertical rate called for by the computer during mode II operation.

Should the vertical rate $\dot{H}$ at any time fall below 100 ft/min, or other minimum value set at potentiometer 49, in the absence of force on the collective control lever 1, relay K–3 is energized to stabilize the altitude of the aircraft at the value it had at the instant K–3 was energized in the manner already explained. Energization of K–3 disconnects the computer from summing network 36 by the opening of contacts p–s and connects the output of summing network 66 to network 36 by closing contacts p–t. Altitude stabilization occurs even though the computer is operating in mode II with contacts a–b of K–6 closed, i.e. within the limits for V and $\gamma$. This situation may be brought about intentionally by the pilot to terminate flight along the inclined path and to stabilize the aircraft in altitude, or it may occur accidentally as, for example, at values of $\gamma$ near 0°, or at low values of V for steeper angles.

From the foregoing description of its operation in conjunction with the collective control system of referenced U.S. Pat. No. 3,482,805, it is seen that the operation of the vertical rate reference computer is entirely automatic with the only pilot input to the computer being through the collective control lever 1. When V and $\gamma$ are within the limits of reliable computer operation, in the example given $V \geq 5$ mph and $\gamma \leq 80°$, the computer operates to stabilize the aircraft at any constant angle flight path selected by the pilot through the collective control lever which does not call for a vertical rate less than a preset minimum, in the example given 100 ft/min. When the values of V or $\gamma$ are outside the limits, or when the vertical rate falls below the preset minimum, the computer is automatically disconnected from the collective control system, which then operates independently of the computer to stabilize the vertical rate or the altitude as in the referenced patent. The computer therefore does not in any way interfere with the system described in the patent but only adds an inclined flight path capability to this system. An "ON" light 140 is provided to indicate to the pilot when the aircraft is under control of the computer. The indicator light circuit comprises additional contact set u–v–w on relay K–3, contacts u–v of which are closed when contacts p–s of this relay are closed, and additional contact set d–e–f on relay K–6, contacts d–e of which are closed when contacts a–b of this relay are closed. The aircraft is under control of the computer only when contacts a–b of K–6 and p–s of K–3 are both closed, under which condition light 140 is energized.

The specific embodiments of the invention described above and in the drawings are not the only constructions possible for the invention. The computer and control system may be constructed using any of the known elements and techniques of the computer and servomechanism arts that are capable of performing the functions specified in the system shown. For example, the system could be basically an A.C. system rather than the basically D.C. system shown, or it could be entirely nonelectrical using fluid techniques.

We claim:

1. A vertical rate reference computer for controlling the flight of an aircraft at a constant flight path angle with the horizontal, comprising: (a) means for continuously deriving the magnitude of the velocity vector of the aircraft; (b) means for continuously deriving the vertical rate of the aircraft; (c) means for continuously multiplying the magnitude of the velocity vector by the fraction for which the product resulting from this multiplication equals the vertical rate; and (d) means for fixing the value of said fraction when a desired flight path angle has been established, the said product thereafter constituting the vertical rate reference for maintaining the flight path angle constant.

2. Apparatus as claimed in claim 1 in which: element (a) provides a voltage analog of the magnitude of the velocity vector; element (b) provides a voltage analog of the vertical rate; element (c) comprises a resistance element having a sliding contact, means for applying the voltage analog of the velocity vector across the resistance element, a servomechanism mechanically coupled to the sliding contact, means for deriving an error signal equal to the difference between the sliding contact voltage and the vertical rate analog, and means for applying the error signal to the servomechanism for adjusting the position of the sliding contact as required to maintain the contact voltage equal to the vertical rate analog; and in which element (d) comprises means for removing the error signal from the servomechanism.

3. Apparatus as claimed in claim 2 and in addition: an attitude director indicator providing a visual vertical rate command, and means associated with the means for removing the error signal from the servomechanism for applying the error signal immediately after removal to said indicator as a vertical rate command signal.

4. Apparatus as claimed in claim 2 in which said aircraft is provided with an automatic flight control system having a vertical rate control channel, and in which there is provided means associated with the means for removing the error signal from the servomechanism for applying the error signal immediately after removal to the vertical rate control channel of the automatic flight control system as a vertical rate command signal.

5. Apparatus as claimed in claim 1 in which there are provided means cooperating with element (d) for preventing the fixing of the value of said fraction whenever the value exceeds a preset maximum near unity and also whenever the magnitude of the velocity vector is below a preset minimum value and means operative whenever the value of said fraction is fixed to provide the difference between the vertical rate of said aircraft and said vertical rate reference as a vertical thrust command for maintaining the flight path angle constant.

6. In a VTOL aircraft having a vertical thrust producing mechanism and a manual vertical thrust control coupled thereto: a force sensor in the manual control coupling for sensing the magnitude and direction of the force applied by the pilot to the manual control and for producing a force signal representative thereof; a servomechanism coupled to the vertical thrust producing mechanism and responsive to said force signal for producing a vertical acceleration of the aircraft proportional to the force applied to the manual control, said servomechanism also having provision for receiving a vertical thrust command signal other than said force signal; means for continuously deriving an altitude signal proportional to the altitude of the aircraft and a vertical rate si;nal proportional to the rate of change of altitude; a vertical rate memory operative in the presence of force on the manual control to continuously follow the vertical rate signal and to store the signal existing at the instant of force removal; means operative in the absence of force on the manual control and in the presence of a vertical rate not less than a preset minimum to apply the difference between the instantaneous vertical rate signal and the stored vertical rate signal to said servomechanism as a vertical thrust command signal; an altitude memory operative in the presence of force on the manual control to continuously follow the altitude signal and to store the signal existing at the instant of force removal; means operative in the absence of force on the manual control and in the presence of a vertical rate less than said preset minimum to apply the difference between the instantaneous altitude signal and the stored altitude signal to said servomechanism as a vertical thrust command signal; means for continuously deriving a velocity vector signal proportional to the magnitude of the velocity vector of the aircraft; means operative in the presence of force on the manual control for multiplying the velocity vector signal by the fraction for which the product resulting from this multiplication equals the vertical rate signal; means operative in the absence of force on the manual control to fix said fraction at the value it had at the instant of force removal, the product of the velocity vector signal and said fixed fraction constituting a vertical rate reference signal; and means operative when the velocity vector of said aircraft is not below a preset minimum, when the angle of the velocity vector measured from the horizontal, for which said fraction is the sine, is not greater than a preset maximum near 90°, when the vertical rate is not below said preset minimum vertical rate, and when force on the manual control is absent to remove from the servomechanism said command signal that is the difference between the instantaneous vertical rate signal and the vertical rate signal stored in the vertical rate memory, to apply the difference between the instantaneous values of the vertical rate signal and the vertical rate reference signal to said servomechanism as a vertical thrust command signal, and to activate said vertical rate memory to continuously follow the vertical rate signal.

* * * * *